United States Patent
Wakao

(10) Patent No.: US 7,630,510 B2
(45) Date of Patent: Dec. 8, 2009

(54) IMAGE VERIFICATION APPARATUS AND IMAGE VERIFICATION METHOD

(75) Inventor: Satoru Wakao, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 598 days.

(21) Appl. No.: 10/815,504

(22) Filed: Mar. 31, 2004

(65) Prior Publication Data

US 2004/0264734 A1    Dec. 30, 2004

(30) Foreign Application Priority Data

Apr. 4, 2003    (JP) ............................. 2003-102327

(51) Int. Cl.
*G06K 9/00*    (2006.01)
*G06F 15/16*    (2006.01)

(52) U.S. Cl. ............................. 382/100; 382/137; 726/4

(58) Field of Classification Search ................ 382/100, 382/112, 113, 116, 119, 135–140, 155, 168, 382/209, 232, 274, 276, 313, 305, 318, 182–189, 382/214, 312; 713/179; 380/54, 218; 726/4; 355/40
See application file for complete search history.

(56) References Cited

U.S. PATENT DOCUMENTS

| | | | | |
|---|---|---|---|---|
| 5,499,294 | A * | 3/1996 | Friedman | 713/179 |
| 5,875,249 | A * | 2/1999 | Mintzer et al. | 380/54 |
| 6,330,051 | B1 * | 12/2001 | Takanashi | 355/40 |
| 7,043,019 | B2 * | 5/2006 | Tehranchi et al. | 380/218 |
| 7,114,177 | B2 * | 9/2006 | Rosenberg et al. | 726/4 |
| 7,130,445 | B2 * | 10/2006 | Ruhl et al. | 382/100 |
| 2002/0060736 | A1 | 5/2002 | Wakao et al. | |
| 2003/0123699 | A1 | 7/2003 | Wakao et al. | |
| 2003/0123700 | A1 | 7/2003 | Wakao | |
| 2003/0126443 | A1 | 7/2003 | Wakao | |
| 2003/0126444 | A1 | 7/2003 | Wakao et al. | |

(Continued)

FOREIGN PATENT DOCUMENTS

JP    64-019865    1/1989

(Continued)

OTHER PUBLICATIONS

U.S. Appl. No. 09/521,424.

(Continued)

*Primary Examiner*—Seyed Azarian
(74) *Attorney, Agent, or Firm*—Cowan, Liebowitz & Latman, P.C.

(57) ABSTRACT

An image verification apparatus includes a verification unit and a control unit. The verification unit verifies, using verification data included in an image file, whether a digital image included in the image file has been altered. The control unit (a) controls the image verification apparatus to display additional information of the digital image on a display unit, if the verification unit verifies that the digital image has not been altered, and (b) controls the image verification apparatus not to display the additional information except a thumbnail image of the digital image on the display unit and to display both the thumbnail image of the digital image and information indicating that the digital image has been altered on the display unit, if the verification unit verifies that the digital image has been altered. The additional information includes the thumbnail image of the digital image.

18 Claims, 13 Drawing Sheets

U.S. PATENT DOCUMENTS

| | | |
|---|---|---|
| 2003/0161536 A1 | 8/2003 | Iwamura et al. |
| 2003/0196086 A1 | 10/2003 | Murakami et al. |
| 2004/0059936 A1 | 3/2004 | Wakao et al. |
| 2004/0230804 A1 | 11/2004 | Wakao et al. |
| 2005/0091497 A1 | 4/2005 | Wakao |

FOREIGN PATENT DOCUMENTS

| | | |
|---|---|---|
| JP | 01-141461 | 6/1989 |
| JP | 08-009116 | 1/1996 |
| JP | 09-074465 | 3/1997 |
| JP | 10-224624 | 8/1998 |
| JP | 2000-338608 | 8/2000 |
| JP | 2000-270172 | 9/2000 |
| JP | 2002-165074 | 6/2002 |
| JP | 2002-244924 | 8/2002 |
| JP | 2003-037717 | 2/2003 |

OTHER PUBLICATIONS

Computer translation of JP2000-338608A.

Office Action dated Sep. 7, 2007 concerning the corresponding Chinese patent application No. 200410031681 4.

Office Action dated Sep. 3, 2007 of Japanese Patent Application No. 2003-128230. (JPA 2003-128230 claims domestic priority in Japan based on JPA 2002-139061 from which current application (i.e., U.S. Appl. No. 10/436,384) claims priority under 35 U.S.C. §119).

\* cited by examiner

FIG. 8

| MAC(10) | DIGITAL SIGNATURE(7) | OTHERS(3) | | | | | | | |
|---|---|---|---|---|---|---|---|---|---|
| THUMBNAIL | FILE NAME | PHOTO-GRAPHING DATE | SHUTTER SPEED | F-NUMBER | ISO SENSITIVITY | SIZE | MODEL NAME | CAMERA ID | VERIFI-CATION RESULT |
| ☺ | IMG_0001.JPG | 2002.12.01 10:40:17 | 1/800 | 5.6 | 100 | 1M | EOS XX | FE0001 | |
| ☺☺ | IMG_0002.TIF | 2002.12.01 10:43:32 | 1/800 | 5.6 | 100 | 2M | EOS XX | FE0001 | |
| ☾ | IMG_0003.JPG | 2002.12.01 10:46:12 | 1/1000 | 5.6 | 400 | 8M | EOS XX | FE0001 | |
| .... | .... | .... | .... | .... | .... | .... | .... | .... | .... |

START VERIFICATION

TOTAL NUMBER OF FILES : 20

FIG. 9

| THUMBNAIL | FILE NAME | PHOTO-GRAPHING DATE | SHUTTER SPEED | F-NUMBER | ISO SENSITIVITY | SIZE | MODEL NAME | CAMERA ID | VERIFI-CATION RESULT |
|---|---|---|---|---|---|---|---|---|---|
| ☾ | IMG_0021.JPG | 2002.12.11 13:43:27 | 1/800 | 5.6 | 100 | 1M | EOS XX | FE0001 | |
| 👥 | IMG_0022.TIF | 2002.12.11 13:43:32 | 1/800 | 5.6 | 100 | 2M | EOS XX | FE0001 | |
| ☀ | IMG_0023.JPG | 2002.12.11 13:46:36 | 1/1000 | 5.6 | 400 | 8M | EOS XX | FE0001 | |
| .... | .... | .... | .... | .... | .... | .... | .... | .... | .... |

MAC(10) | DIGITAL SIGNATURE(7) | OTHERS(3)

TOTAL NUMBER OF FILES : 20

START VERIFICATION

FIG. 12

| THUMBNAIL | FILE NAME | PHOTO-GRAPHING DATE | SHUTTER SPEED | F-NUMBER | ISO SENSITIVITY | SIZE | MODEL NAME | CAMERA ID | VERIFI-CATION RESULT |
|---|---|---|---|---|---|---|---|---|---|
| ☺ | IMG_0001.JPG | 2002.12.01 10:40:17 | 1/800 | 5.6 | 100 | 1M | EOS XX | FE0001 | OK |
| ✗ | IMG_0002.TIF | | | | | | | | NG |
| ☾ | IMG_0003.JPG | 2002.12.01 10:46:12 | 1/1000 | 5.6 | 400 | 8M | EOS XX | FE0001 | OK |
| .... | .... | .... | .... | .... | .... | .... | .... | .... | .... |

MAC(10)   DIGITAL SIGNATURE(7)   OTHERS(3)

TOTAL NUMBER OF FILES : 20

START VERIFICATION

FIG. 13

| THUMBNAIL | FILE NAME | PHOTO-GRAPHING DATE | SHUTTER SPEED | F-NUMBER | ISO SENSITIVITY | SIZE | MODEL NAME | CAMERA ID | VERIFI-CATION RESULT |
|---|---|---|---|---|---|---|---|---|---|
| ◐ | IMG_0021.JPG | 2002.12.11 13:43:27 | 1/800 | 5.6 | 100 | 1M | EOS XX | FE0001 | OK |
| ⊠ | IMG_0022.TIF | | | | | | | | NG |
| ☀ | IMG_0023.JPG | 2002.12.11 13:46:36 | 1/1000 | 5.6 | 400 | 8M | EOS XX | FE0001 | OK |
| ⋯ | ⋯ | ⋯ | ⋯ | ⋯ | ⋯ | ⋯ | ⋯ | ⋯ | ⋯ |

MAC(10)　DIGITAL SIGNATURE(7)　OTHERS(3)

TOTAL NUMBER OF FILES : 20

START VERIFICATION

IMAGE VERIFICATION APPARATUS AND IMAGE VERIFICATION METHOD

CROSS-REFERENCE TO RELATED APPLICATIONS

The present application claims priority under 35 U.S.C. §119 to Japanese Patent Application No. 2003-102327 filed on Apr. 4, 2003, the entire content of which being hereby incorporated herein by reference.

FIELD OF THE INVENTION

The present invention relates to an image verification apparatus and image verification method which verify whether an image file has been altered.

BACKGROUND OF THE INVENTION

There is proposed a system which verifies alteration of an image file generated by an image sensing apparatus such as a digital camera (see, e.g., U.S. Pat. No. 5,499,294 and Japanese Patent Application Laid-Open No. 2002-244924). In such system, when an image file containing image data and accessory information (thumbnail image, photographing date & time, shutter speed, F-number, ISO sensitivity, model name, manufacturing number, and the like) is determined to have been altered, the accessory information may have been altered.

However, the conventional system does not consider notification of accessory information which may have been altered to the user in an easy-to-understand way.

SUMMARY OF THE INVENTION

The present invention has been made to overcome the conventional drawbacks, and has as its main object to notify the user in an easy-to-understand way of accessory information which may have been altered.

According to an aspect of the present invention, an image verification apparatus comprising:
  verification unit adapted to verify whether an image file has been altered; and display form change unit adapted to change a display form of accessory information of the image file when the image file is detected to have been altered.

According to another aspect of the present invention, an image verification method comprising: a verification step of verifying whether an image file has been altered; and a display form change step of changing a display form of accessory information of the image file when the image file is detected to have been altered.

According to a further aspect of the present invention, a computer program causing a computer to execute an image verification method of the present invention.

According to yet further aspect of the present invention, a computer-readable recording medium recording a computer program of the present invention.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a view showing an example of a list window (before verification) for an "MAC" group;

FIG. 9 is a view showing an example of a list window (before verification) for a "digital signature" group;

FIG. 12 is a view showing an example of a list window (after verification) for the "MAC" group; and FIG. 13 is a view showing an example of a list window (after verification) for the "digital signature" group.

DETAILED DESCRIPTION OF THE PREFERRED EMBODIMENTS

Preferred embodiments of the present invention will now be described in detail in accordance with the accompanying drawings.

First Embodiment

Figure 1:
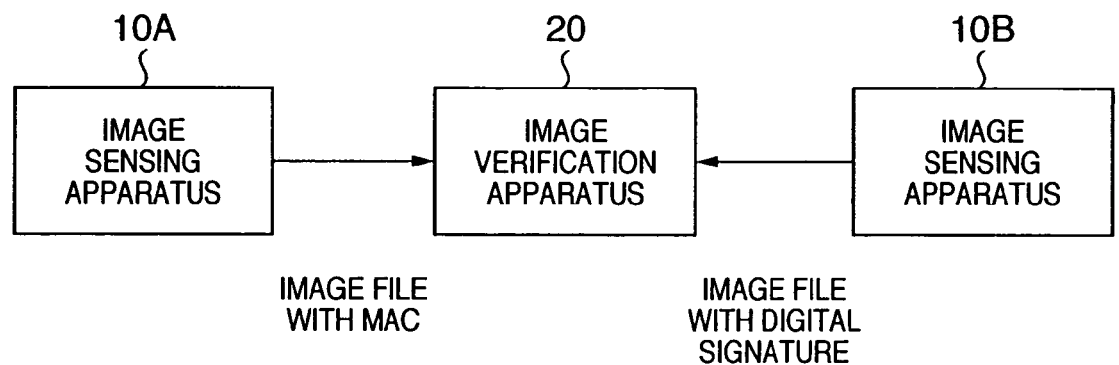
FIG. 1 is a block diagram showing the main building components of an image verification system according to the first embodiment.

The main building components of an image verification system according to the first embodiment of the present invention will be explained with reference to FIG. 1.

An image sensing apparatus 10A generates an image file with an MAC (Message Authentication Code) from digital image data of an object, and records the generated image file with the MAC on, e.g., a removable recording medium (e.g., a memory card) or the recording medium of an external apparatus. The image sensing apparatus 10A can be implemented by an apparatus such as a digital camera, a digital video camera, a portable terminal (PDA, cell phone, or the like) with a camera function, a scanner, a copying machine, or a facsimile apparatus.

An image sensing apparatus 10B generates an image file with a digital signature from digital image data of an object, and records the generated image file with the digital signature on, e.g., a removable recording medium (e.g., a memory card) or the recording medium of an external apparatus. Similar to the image sensing apparatus 10A, the image sensing apparatus 10B can be implemented by an apparatus such as a digital still camera, a digital video camera, a portable terminal (PDA, cell phone, or the like) with a camera function, a scanner, a copying machine, or a facsimile apparatus.

In the following description, the image sensing apparatuses 10A and 10B are digital still cameras or apparatuses having the digital still camera function.

An image verification apparatus 20 has a function of verifying whether an image file with an MAC generated by the image sensing apparatus 10A or an image file with a digital signature generated by the image sensing apparatus 10B has been altered, and a function of notifying the verifier (user) of the verification result. The image verification apparatus 20 also has a function of notifying the verifier of accessory information (thumbnail image, photographing date & time, shutter speed, F-number, ISO sensitivity, model name, manufacturing number, and the like) for an image file with an MAC or digital signature. These functions are realized when the CPU or MPU of the image verification apparatus 20 executes an image 10, verification program stored in a storage device and performs necessary control.

Figure 2:
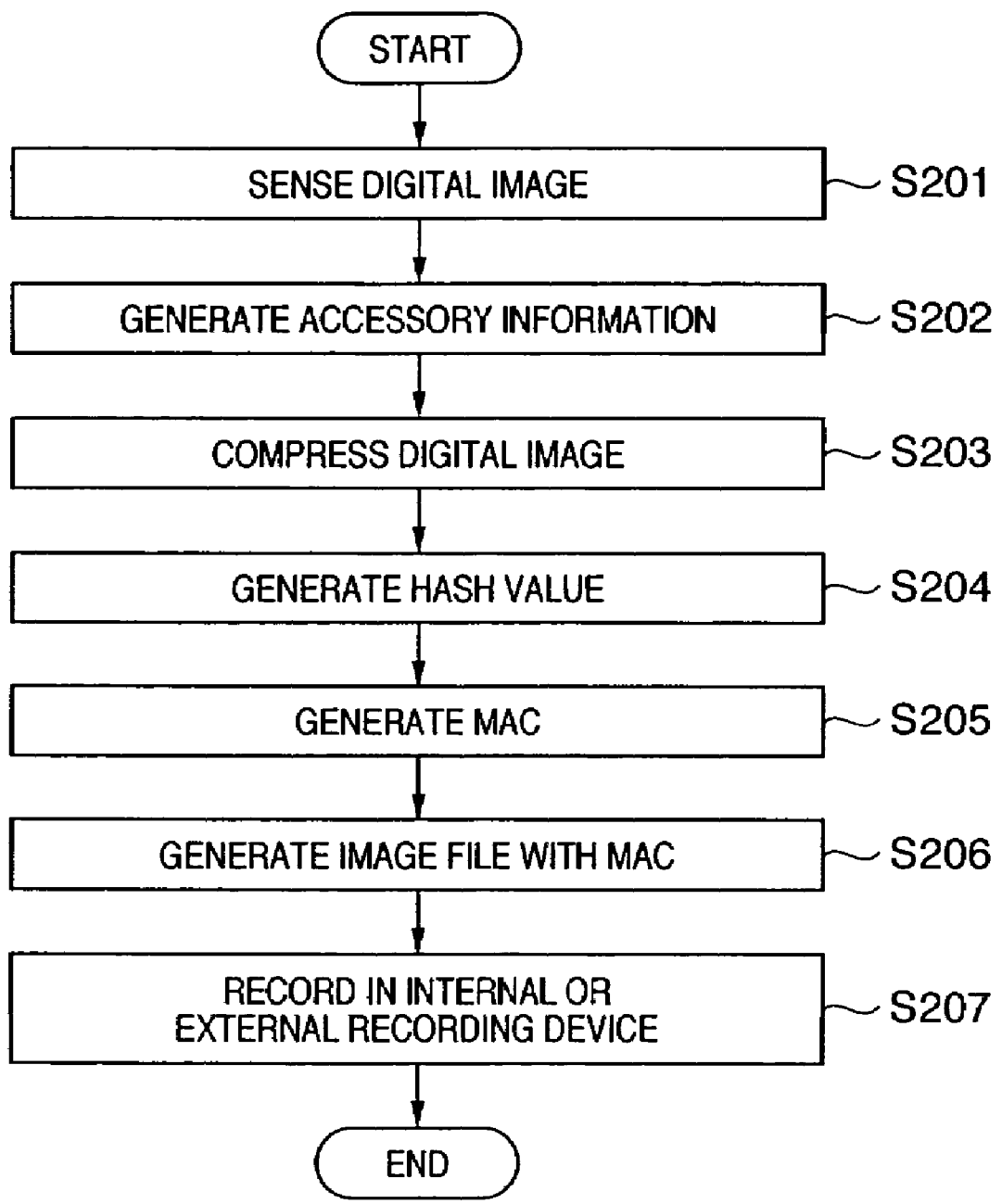
FIG. 2 is a flow chart for explaining processing of generating an image file with an MAC.

Processing of generating an image file with an MAC in the image sensing apparatus 10A will be explained with reference to the flow chart of FIG. 2. Step S201: the image sensing apparatus 10A generates digital image data of an object in accordance with an instruction from the photographer.

Step S202: the image sensing apparatus 10A generates accessory information (thumbnail image, photographing date & time, shutter speed, F-number, ISO sensitivity, and the like) from photographing information and photographed image data.

Step S203: the image sensing apparatus 10A compresses the sensed digital image data in accordance with the image compression method (lossless compression, JPEG, or the like) selected by the photographer.

Step S204: the image sensing apparatus 10A generates a hash value (also called digest data) for the accessory information generated in step S202 and the digital image data compressed in step S203. That is, the first embodiment verifies both the accessory information and digital image. Examples of a usable hash function necessary to generate a hash value are MD5, SHA1, and RIPEMD.

Step S205: the image sensing apparatus 10A converts the hash value generated in step S204 into an MAC (Message Authentication Code). The MAC is information necessary to verify whether accessory information and a digital image have been altered. In other words, the MAC is information necessary to verify whether digital image data and accessory information are originals. The first embodiment adopts a common key Kc to generate an MAC. The common key Kc is information corresponding to the common key of common key cryptography (which is cryptography using the same key as encryption and description keys and is also called secret key cryptography or symmetric key cryptography). The common key Kc is information which must be managed in secret in the image sensing apparatus 10A.

Figure 4:
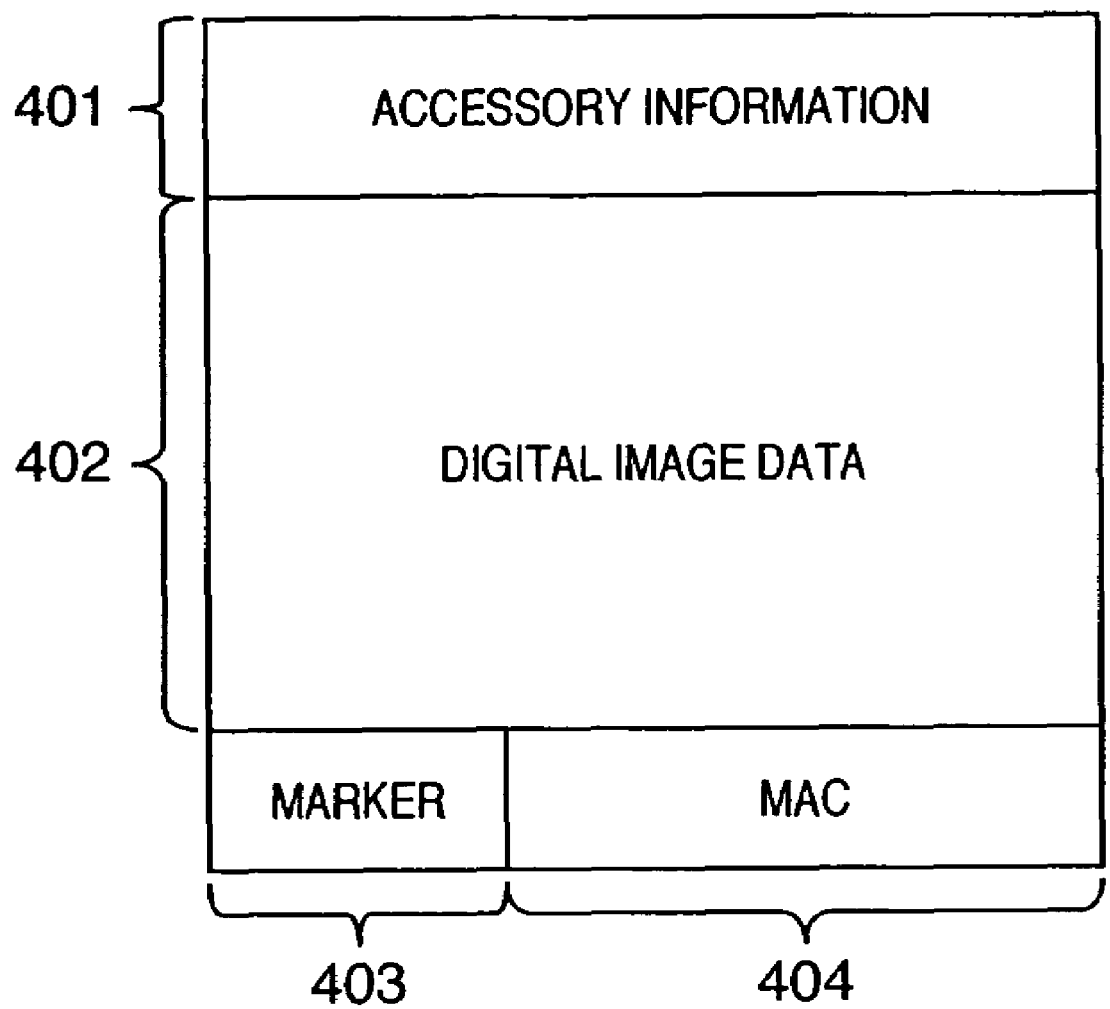
FIG. 4 is a view showing an example of the structure of an image file with an MAC.

Step S206: the image sensing apparatus 10A generates an image file with an MAC. FIG. 4 shows an example of the data structure of an image file with an MAC. An area 401 stores accessory information generated in step S202. That is, the area 401 stores information (thumbnail image, photographing date & time, shutter speed, F-number, ISO sensitivity, and the like) on an image file, and information (model name, manufacturing number, and the like) on an apparatus which has generated the image file. In the first embodiment, a number which specifies an apparatus that has generated an image file will be called a "manufacturing number". An area 402 stores digital image data compressed in step S203. That is, the area 402 stores original image data. An area 403 contains a marker representing the type of verification data present in an area 404. In this case, the marker represents an MAC. The area 404 stores an MAC obtained in step S205. The area 404 can be set between the areas 401 and 402 or in the area 401.

Step S207: the image sensing apparatus 10A records the image file with the MAC generated in step S206 on a removable recording medium (memory card or the like) or the recording medium of an external apparatus.

Figure 3:
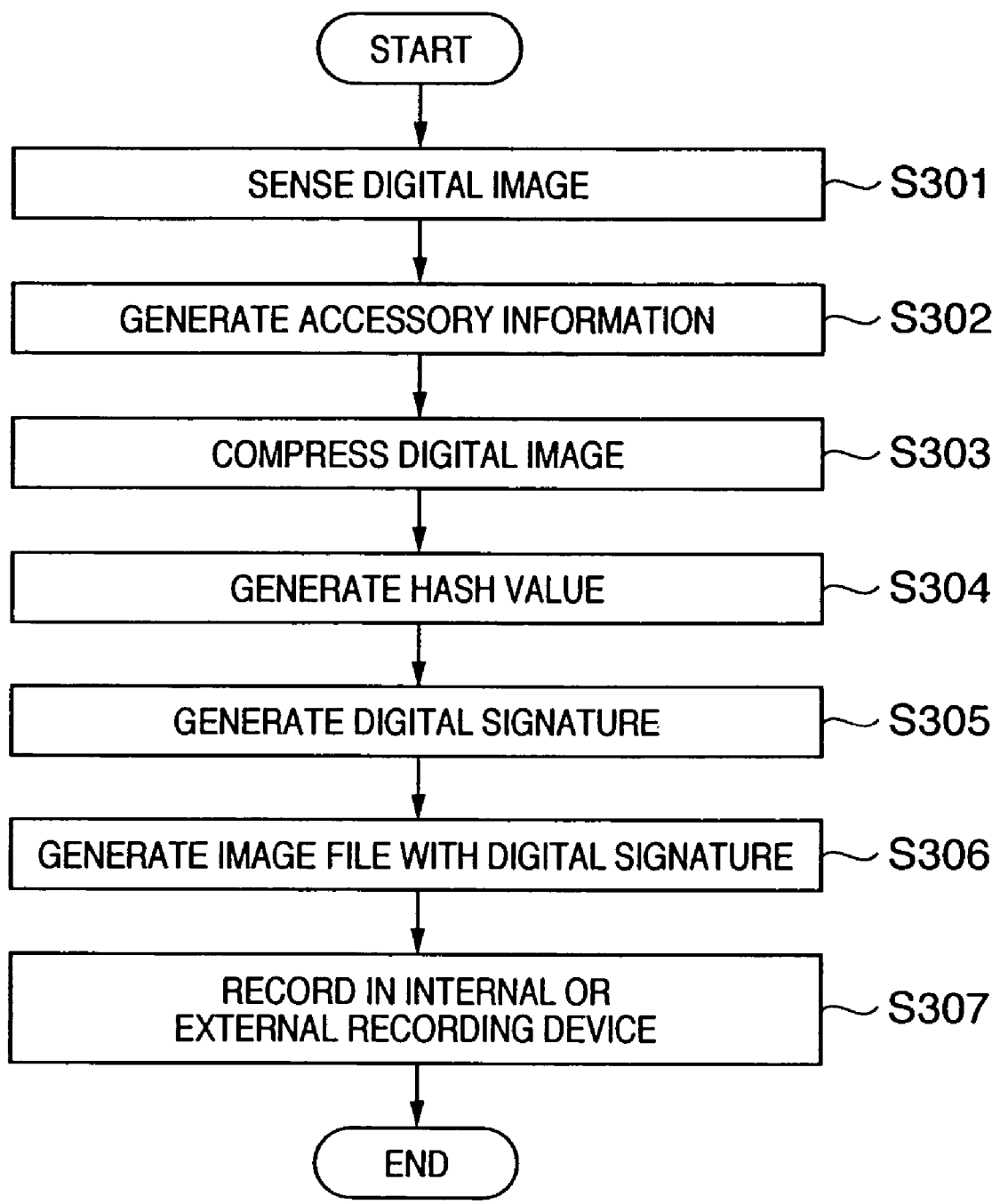
FIG. 3 is a flow chart for explaining processing of generating an image file with a digital signature.

Processing of generating an image file with a digital signature in the image sensing apparatus 10B will be explained with reference to the flow chart of FIG. 3.

Step S301: the image sensing apparatus 10B generates digital image data of an object in accordance with an instruction from the photographer.

Step S302: the image sensing apparatus 10B generates accessory information (thumbnail image, photographing date & time, shutter speed, F-number, ISO sensitivity, and the like).

Step S303: the image sensing apparatus 10B compresses the sensed digital image data in accordance with the image compression method (lossless compression, JPEG, or the like) selected by the photographer.

Step S304: the image sensing apparatus 10B generates a hash value (also called digest data) for the accessory information generated in step S302 and the digital image compressed in step S303. That is, the first embodiment verifies both the accessory information and digital image. Examples of a usable hash function necessary to generate a hash value are MD5, SHA1, and RIPEMD.

Step S305: the image sensing apparatus 10B converts the hash value generated in step S304 into a digital signature. The digital signature is information necessary to verify whether accessory information and a digital image have been altered. In other words, the digital signature is information necessary to verify whether digital image data and accessory information are originals. The first embodiment adopts a secret key Ks to generate a digital signature. The secret key Ks is information corresponding to the secret key of common key cryptography (which is cryptography using different encryption and description keys and is also called asymmetric key cryptography). The secret key Ks is information which must be managed in secret in the image sensing apparatus 10B.

Figure 5:
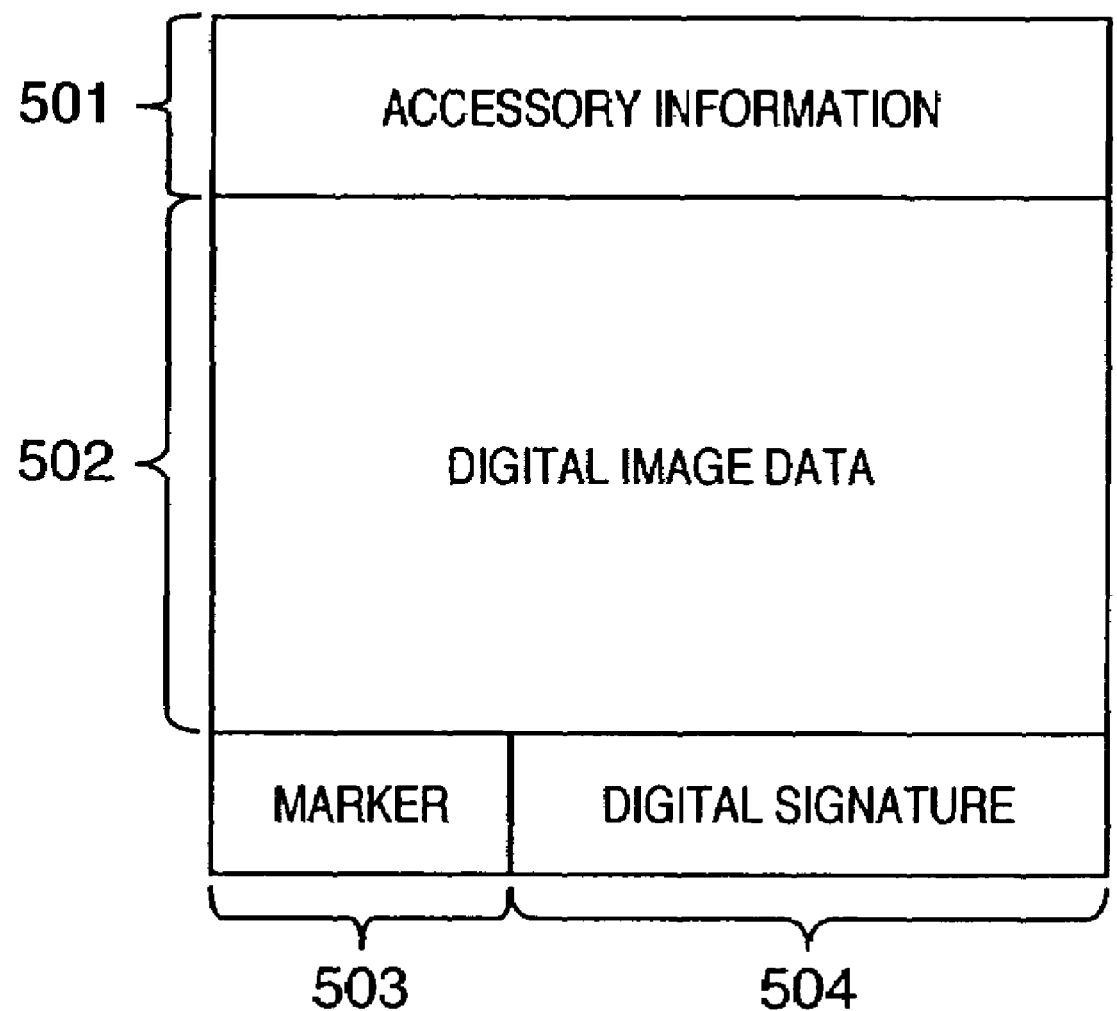
FIG. 5 is a view showing an example of the structure of an image file with a digital signature.

Step S306: the image sensing apparatus 10B generates an image file with a digital signature. FIG. 5 shows an example of the data structure of an image file with a digital signature. An area 501 stores accessory information generated in step S302. That is, the area 501 stores information (thumbnail image, photographing date & time, shutter speed, F-number, ISO sensitivity, and the like) on an image file, and information (model name, manufacturing number, and the like) on an apparatus which has generated the image file. An area 502 stores digital image data compressed in step S303. That is, the area 502 stores an original image. An area 503 contains a marker representing the type of verification data present in an area 504. In this case, the marker represents a digital signature. The area 504 stores a digital signature obtained in step S305. The area 504 can be set between the areas 501 and 502 or in the area 501.

Step S307: the image sensing apparatus 10B records the image file with the digital signature generated in step S306 on a removable recording medium (memory card or the like) or the recording medium of an external apparatus.

Figure 6:
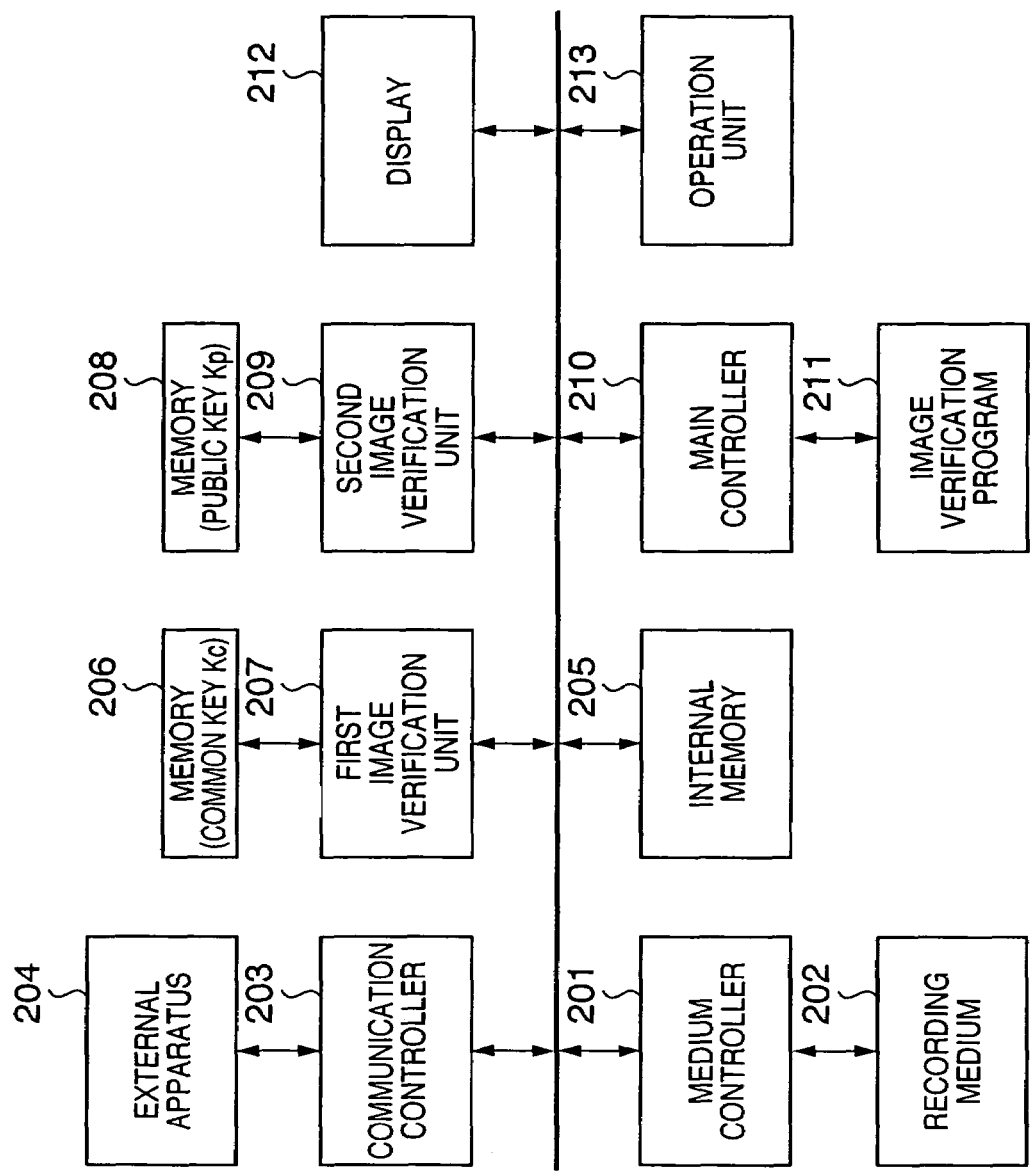
FIG. 6 is a block diagram showing the mail building components of an image verification apparatus 20.

The main building components of the image verification apparatus 20 will be explained with reference to FIG. 6.

A medium controller 201 reads out an image file with an MAC or digital signature selected by the verifier from a removable recording medium 202, and stores the readout image file with the MAC or digital signature in an internal memory 205. The removable recording medium 202 may be connectable to the image sensing apparatus 10A or 10B.

A communication controller 203 reads out the image file with the MAC or digital signature selected by the verifier from the recording medium of an external apparatus 204 via a network, and stores the readout image file with the MAC or digital signature in the internal memory 205. The external apparatus 204 may be the image sensing apparatus 10A or 10B.

A memory 206 stores the common key Kc necessary to verify alteration of an image file with an MAC. The common key Kc is the same key as a common key Kc managed in secret by the image sensing apparatus 10A. The common key Kc is also information which must be managed in secret in the image verification apparatus 20. A first image verification unit 207 verifies using the common key Kc in the memory 206 whether the image file with the MAC in the internal memory 205 has been altered.

A memory 208 stores a public key Kp necessary to verify alteration of an image file with a digital signature. The public key Kp corresponds to the secret key Ks managed in secret by the image sensing apparatus 10B. The public key Kp is information which corresponds to the public key of public key cryptography and need not be managed in secret. A second image verification unit 209 verifies using the public key Kp in the memory 208 whether an image file with a digital signature in the internal memory 205 has been altered.

A main controller 210 has a microcomputer which executes an image verification program stored in a program memory 211.

A display 212 displays a list window which is generated by the main controller 210 in accordance with the image verification program. Examples of the list window are illustrated in FIGS. 8 and 9. The list window shown in FIG. 8 is a list window for an "MAC" group, and displays, side by side, pieces of accessory information (thumbnail image, photographing date & time, shutter speed, F-number, ISO sensitivity, model name, manufacturing number, and the like), file names, sizes, and verification results for all image files with MACs belonging to the "MAC" group. The list window shown in FIG. 9 is a list window for a "digital signature" group, and contains pieces of accessory information (thumbnail image, photographing date & time, shutter speed, F-number, ISO sensitivity, model name, manufacturing number, and the like), file names, sizes, and verification results for all image files with digital signatures belonging to the "digital signature" group.

As shown in FIGS. 8 and 9, the first embodiment displays the MAC group, digital signature group, and "others" group by assigning different tabs. Although these groups may also be displayed in independent windows, tab display facilitates switching between groups to be displayed.

An operation unit 213 receives an instruction from the verifier, and supplies the received instruction to the main controller 210. The verifier operates the operation unit 213 to register an image file with an MAC or digital signature in the image verification apparatus. The verifier operates the operation unit 213 to select an image file with an MAC or digital signature to be verified in accordance with the image verification program.

The operation unit 213 includes, e.g., a touch panel arranged on the display 212, and allows clicking a button contained in a GUI displayed on the display 212 or designating switching of a tab to be displayed.

Figure 7:
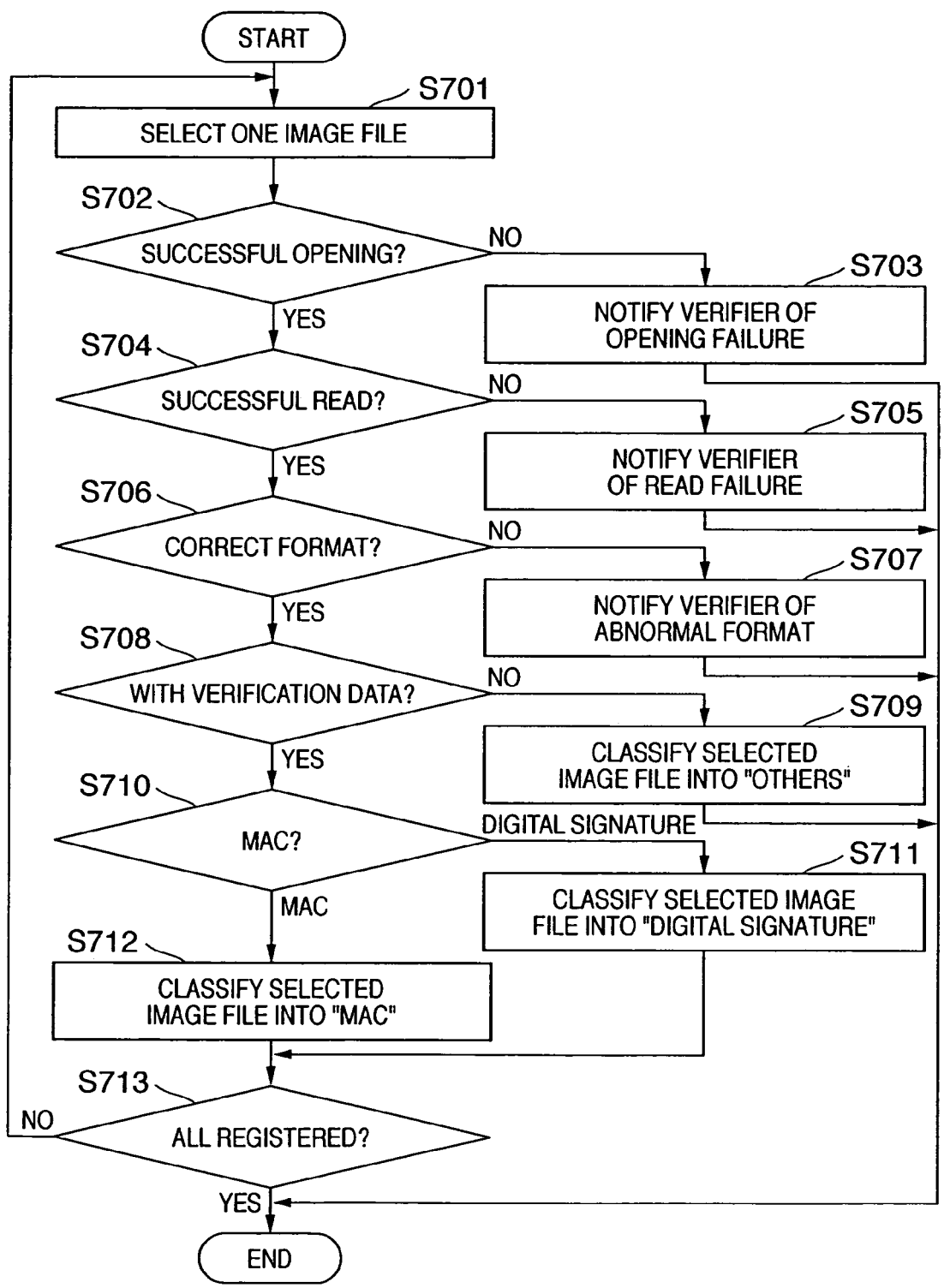
FIG. 7 is a flow chart for explaining image registration processing.

Image registration processing of registering one or more image files selected by the verifier in the image verification apparatus will be explained with reference to the flow chart of FIG. 7. Image registration processing is executed by the image verification apparatus 20 in accordance with the image verification program.

Step S701: the main controller 210 selects one image file in accordance with a predetermined order from one or more image files selected by the verifier. An image file selected by the main controller 210 will be called a "selected image file". When the verifier selects a folder, the main controller 210 performs processing on the assumption that all image files in the folder have been selected.

Step S702: the main controller 210 opens the selected image file, and determines whether the selected image file has successfully been opened. If YES in step S702, the flow advances to step S704; if NO, to step S703.

Step S703: the main controller 210 displays on the display 212 a message or sign representing that opening of the selected image file has failed.

Step S704: the main controller 210 reads the selected image file in order to load the selected image file from the removable recording medium 202 or the recording medium of the external apparatus 204 into the internal memory 205. If read of the selected image file fails, the flow advances to step S705; if read of the selected image file is successful, to step S706.

Step S705: the main controller 210 displays on the display 212 a message or sign representing that read of the selected image file has failed.

Step S706: the main controller 210 inspects the file format of the selected image file in the internal memory 205, and determines whether the file format of the selected image file is normal. If YES in step S706, the flow advances to step S708; if NO, to step S707.

Step S707: if NO in step S706, the main controller 210 discards the selected image file in the internal memory 205, and displays on the display 212 a message or sign representing that the file format of the selected image file is abnormal.

Step S708: if YES in step S706, the main controller 210 determines whether verification data (MAC or digital signature in the first embodiment) has been added to the selected image file. If YES in step S708, the flow advances to step S710; if NO, to step S709.

Step S709: if NO in step S708, the main controller 210 classifies the selected image file into the "others" group. The "others" group contains image files having no MAC or digital signature. The main controller 210 registers the accessory information (thumbnail image, photographing date & time, shutter speed, F-number, ISO sensitivity, model name, manufacturing number, and the like), file name, and size of the selected image file in an "others" table within the internal memory 205. The "others" table is a management table which manages image files classified into the "others" group. The main controller 210 displays the thumbnail image, file name, photographing date & time, shutter speed, F-number, ISO sensitivity, size, model name, and manufacturing number of the selected image file side by side in the list window for the "others" group. If no thumbnail image can be extracted from the selected image file, the main controller 210 displays a message or sign representing that no thumbnail image exists, in a column which displays a thumbnail image in the list window. The main controller 210 displays the total number of image files belonging to the "others" group in the list window.

Step S710: the main controller 210 detects the type of verification data added to the selected image file. If the verification data is an MAC, the flow advances to step S712; if the verification data is a digital signature, to step S711.

Step S711: If the verification data of the selected image file is a digital signature, the main controller 210 classifies the selected image file into the "digital signature" group. The "digital signature" group contains image files with digital signatures. The main controller 210 registers the accessory information (thumbnail image, photographing date & time, shutter speed, F-number, ISO sensitivity, model name, manufacturing number, and the like), file name, and size of the selected image file in a "digital signature" table within the internal memory 205. The "digital signature" table is a management table which manages image files classified into the "digital signature" group. As shown in FIG. 9, the main controller 210 displays the thumbnail image, file name, photographing date & time, shutter speed, F-number, ISO sensitivity, size, model name, and manufacturing number of the selected image file side by side in the list window for the "digital signature" group. If the selected image file does not have any thumbnail image, the main controller 210 displays a message or sign representing that no thumbnail image exists, in a column which displays a thumbnail image in the list window. As shown in FIG. 9, the main controller 210 displays the total number (seven in the first embodiment) of image files belonging to the "digital signature" group in the list window, and the total number (20 in the first embodiment) of image files belonging to all the groups.

Step S712: If the verification data of the selected image file is an MAC, the main controller 210 classifies the selected image file into the "MAC" group. The "MAC" group contains image files with MACs. The main controller 210 registers the accessory information (thumbnail image, photographing date & time, shutter speed, F-number, ISO sensitivity, model name, manufacturing number, and the like), file name, and size of the selected image file in an "MAC" table within the internal memory 205. The "MAC" table is a management table which manages image files classified into the "MAC" group. As shown in FIG. 8, the main controller 210 displays the thumbnail image, file name, photographing date & time, shutter speed, F-number, ISO sensitivity, size, model name, and manufacturing number of the selected image file side by side in the list window for the "MAC" group. If the selected image file does not have any thumbnail image, the main controller 210 displays a message or sign representing that no thumbnail image exists, in a column which displays a thumbnail image in the list window. As shown in FIG. 8, the main controller 210 displays the total number (10 in the first embodiment) of image files belonging to the "MAC" group in the list window, and the total number (20 in the first embodiment) of image files belonging to all the groups.

Step S713: the main controller 210 determines whether all image files selected by the verifier have been registered. If NO in step S713, the main controller 210 returns to step S701.

By the above sequence, the image verification apparatus 20 according to the first embodiment can register one or more image files selected by the verifier.

Figure 10:
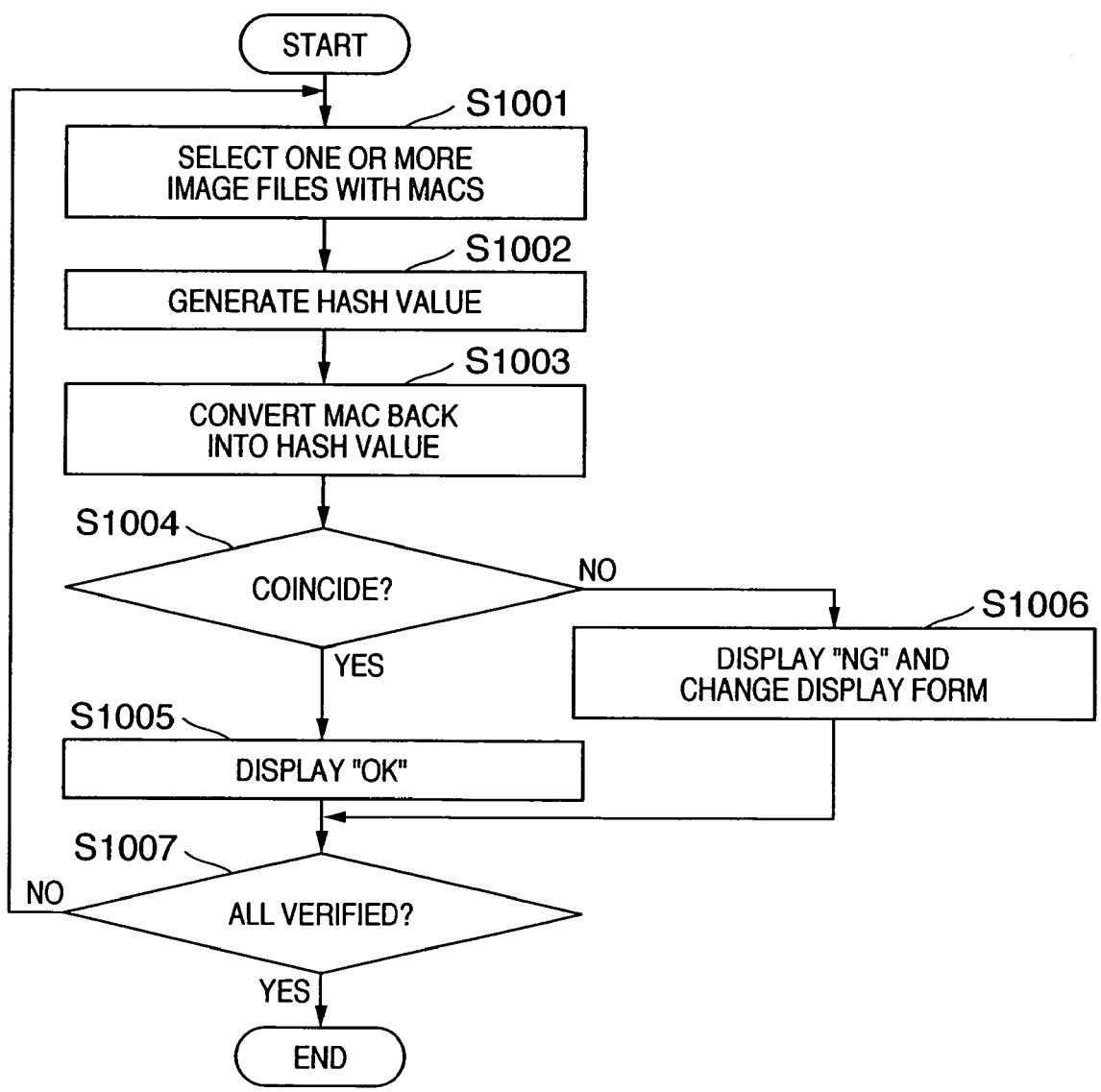
FIG. 10 is a flow chart for explaining the first image verification processing.

The first image verification processing of verifying whether an image file with an MAC has been altered will be described with reference to the flow chart of FIG. 10. The first image verification processing is executed by the first image verification unit 207 of the image verification apparatus 20 under the control of the main controller 210.

Step S1001: the verifier selects one or more image files with MACs to be verified from the "MAC" group tab in the list window by using the operation unit 213, and designates the start of verification by clicking a "verification start" button shown in FIG. 8. The main controller 210 detects that the "verification start" button has been clicked, and selects one image file with an MAC in accordance with a predetermined order from the one or more image files with MACs selected by the verifier. An image file with an MAC selected by the main controller 210 will be called a "selected image file".

Step S1002: the main controller 210 loads the selected image file from the removable recording medium 202 or the recording medium of the external apparatus 204 into the internal memory 205, and requests the first image verification unit 207 to verify the selected image file. The first image verification unit 207 extracts accessory information and digital image data from the areas 401 and 402 of the selected image file, and generates their hash value.

Step S1003: the first image verification unit 207 extracts the MAC from the area 404 of the selected image file, and reads out the common key Kc from the memory 206. The first image verification unit 207 converts (decrypts) the MAC back into a hash value by using the common key Kc.

Step S1004: the first image verification unit 207 compares the hash value obtained in step S1002 and the hash value obtained in step S1003, and determines whether the two hash values coincide with each other, in order to verify whether the selected image file has been altered. If the areas 401, 402, and 404 of the selected image file have not been altered, the two hash values coincide with each other. In this case, the first image verification unit 207 determines "not altered", in other words, that the selected image file is an original.

If at least one of the areas 401, 402, and 404 of the selected image file has been altered, the two hash values do not coincide with each other. In this case, the first image verification unit 207 determines "altered", in other words, the selected image file is not an original. The determination result of the first image verification unit 207 is sent to the main controller 210.

Step S1005: if the two hash values coincide with each other, the main controller 210 displays "OK" in the column for the verification result of the selected image file in the list window, as shown in FIG. 12. "OK" is information representing that the selected image file is an image file determined to be "not altered".

Step S1006: if the two hash values do not coincide with each other, the main controller 210 displays "NG" in the verification result column, as shown in FIG. 12. "NG" is information representing that the selected image file is an image file determined to have been "altered". If the selected image file is an image file determined to have been "altered", accessory information in the area 401 may have been altered. To notify the verifier that accessory information (thumbnail image, photographing date & time, shutter speed, F-number, ISO sensitivity, size, model name, manufacturing number, and the like) obtained from the area 401 of the selected image file may have been altered, the main controller 210 changes the display form of the accessory information in the list window for the selected image file determined to have been "altered".

As change examples of the display form, the first to third display forms will be explained. In the first display form, all pieces of information displayed in the columns for the thumbnail, photographing date & time, shutter speed, F-number, ISO sensitivity, size, model name, and manufacturing number are erased. In the second display form, a sign (e.g., "X") representing the possibility of alteration is added to a thumbnail image displayed in the thumbnail column, and all pieces of information displayed in the columns for the photographing date & time, shutter speed, F-number, ISO sensitivity, size, model name, and manufacturing number are erased, as shown in FIG. 12. In the third display form, a sign (e.g., "X") representing the possibility of alteration is added to all pieces of information displayed in the columns for the thumbnail, photographing date & time, shutter speed, F-number, ISO sensitivity, size, model name, and manufacturing number. Another display form can also be adopted as far as the display form can notify the verifier that accessory information of the selected image file may have been altered.

Step S1007: the main controller 210 determines whether all image files with MACs selected by the verifier have been verified. If NO in step S1007, the flow returns to step S1001.

By this processing sequence, the image verification apparatus 20 can verify whether an image file with an MAC selected by the verifier has been altered.

Figure 11:
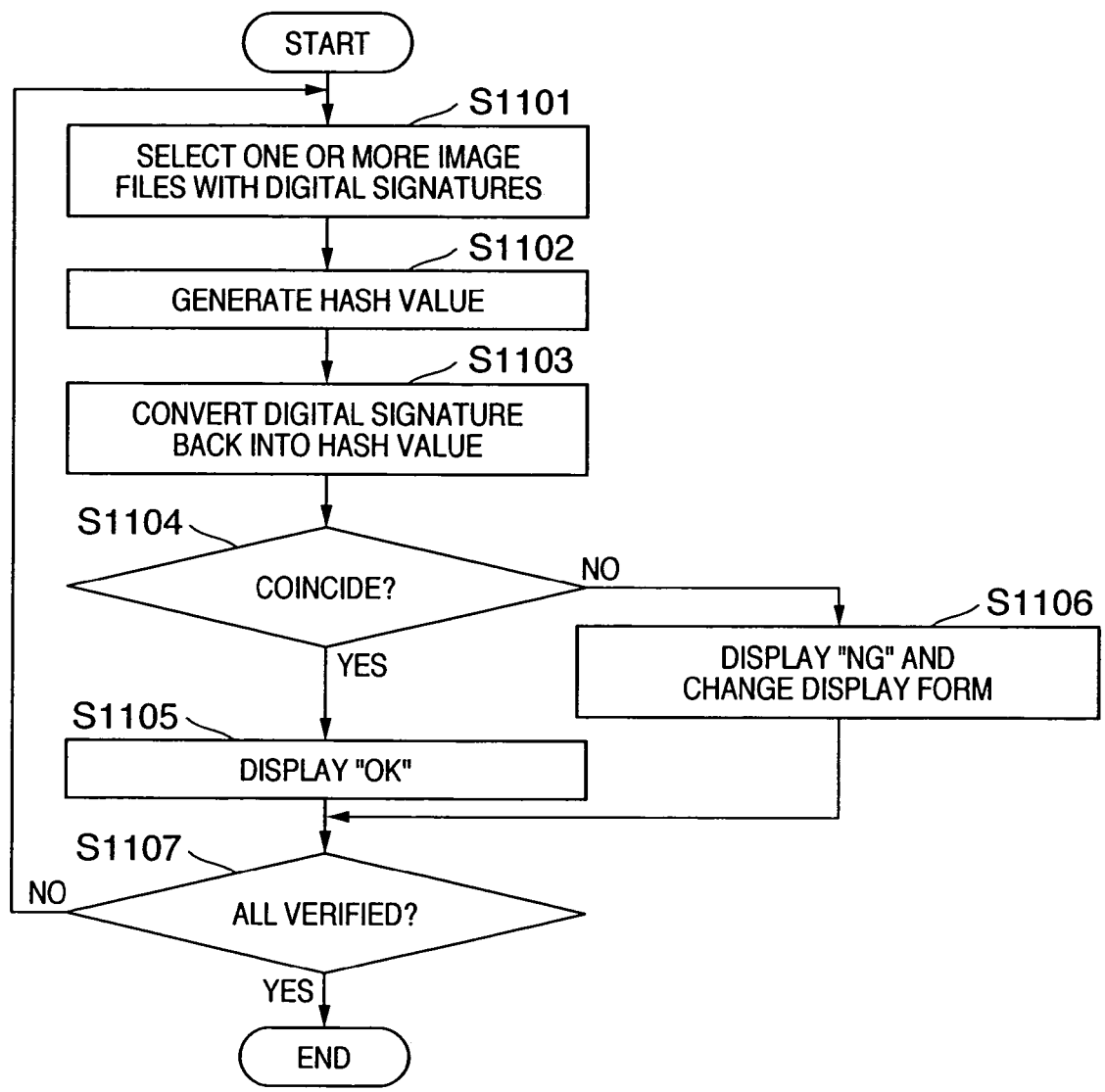
FIG. 11 is a flow chart for explaining the second image verification processing.

The second image verification processing of verifying whether an image file with a digital signature has been altered will be described with reference to the flow chart of FIG. 11. The second image verification processing is executed by the second image verification unit 209 of the image verification apparatus 20 under the control of the main controller 210.

Step S1101: the verifier selects, from the "digital signature" group, one or more image files with digital signatures to be verified in accordance with the image verification program, and clicks a "verification start" button shown in FIG. 9. The main controller 210 detects that the "verification start" button has been clicked, and selects one image file with a digital signature in accordance with a predetermined order from the one or more image files with digital signatures selected by the verifier. An image file with a digital signature selected by the main controller 210 will be called a "selected image file".

Step S1102: the main controller 210 loads the selected image file from the removable recording medium 202 or the recording medium of the external apparatus 204 into the internal memory 205, and requests the second image verification unit 209 to verify the selected image file. The second image verification unit 209 extracts accessory information and digital image data from the areas 501 and 502 of the selected image file, and generates their hash value.

Step S1103: the second image verification unit 209 extracts the digital signature from the area 504 of the selected image file, and reads out the public key Kp from the memory 208. The second image verification unit 209 converts (decrypts) the digital signature back into a hash value by using the public key Kp.

Step S1104: the second image verification unit 209 compares the hash value obtained in step S1102 and the hash value obtained in step S1103, and determines whether the two hash values coincide with each other, in order to verify whether the selected image file has been altered. If the areas 501, 502, and 504 of the selected image file have not been altered, the two hash values coincide with each other. In this case, the second image verification unit 209 determines "not altered", in other words, that the selected image file is an original.

If at least one of the areas 501, 502, and 504 of the selected image file has been altered, the two hash values do not coincide with each other. In this case, the second image verification unit 209 determines "altered", in other words, the selected image file is not an original. The determination result of the second image verification unit 209 is sent to the main controller 210.

Step S1105: if the two hash values coincide with each other, the main controller 210 displays "OK" in the column for the verification result of the selected image file in the list window, as shown in FIG. 13. "OK" is information representing that the selected image file is an image file determined to be "not altered".

Step S1106: if the two hash values do not coincide with each other, the main controller 210 displays "NG" in the verification result column, as shown in FIG. 13. "NG" is information representing that the selected image file is an image file determined to have been "altered". If the selected image file is an image file determined to have been "altered", accessory information in the area 501 may have been altered. To notify the verifier that accessory information (thumbnail image, photographing date & time, shutter speed, F-number, ISO sensitivity, size, model name, manufacturing number, and the like) obtained from the area 501 of the selected image file may have been altered, the main controller 210 changes the display form of the accessory information in the list window for the selected image file determined to have been "altered".

As change examples of the display form, the first to third display forms will be explained. In the first display form, all pieces of information displayed in the columns for the thumbnail, photographing date & time, shutter speed, F-number, ISO sensitivity, size, model name, and manufacturing number are erased. In the second display form, a sign (e.g., "X") representing the possibility of alteration is added to a thumbnail image displayed in the thumbnail column, and all pieces of information displayed in the columns for the photographing date & time, shutter speed, F-number, ISO sensitivity, size, model name, and manufacturing number are erased, as shown in FIG. 13. In the third display form, a sign (e.g., "X") representing the possibility of alteration is added to all pieces of information displayed in the columns for the thumbnail, photographing date & time, shutter speed, F-number, ISO sensitivity, size, model name, and manufacturing number. Another display form can also be adopted as far as the display form can notify the verifier that accessory information of the selected image file may have been altered.

Step S1107: the main controller 210 determines whether all image files with digital signatures selected by the verifier have been verified. If NO in step S1107, the main controller 210 returns to step S1101.

By this processing sequence, the image verification apparatus 20 can verify whether an image file with a digital signature selected by the verifier has been altered.

In this manner, the image verification apparatus 20 according to the first embodiment can change the display form of accessory information (thumbnail image, photographing date & time, shutter speed, F-number, ISO sensitivity, size, model name, manufacturing number, and the like) of an image file with an MAC determined to have been altered. The verifier can be notified in an easy-to-understand way of accessory information which may have been altered.

Also, the image verification apparatus 20 according to the first embodiment can change the display form of accessory information (thumbnail image, photographing date & time, shutter speed, F-number, ISO sensitivity, size, model name, manufacturing number, and the like) of an image file with a digital signature determined to have been altered. The verifier can be notified in an easy-to-understand way of accessory information which may have been altered.

Second Embodiment

In the first embodiment, an image file selected from the list window is verified, and the display form of the list window is changed in accordance with the result. Alternatively, for example, all image files may be verified in displaying the list window, and the list window may be displayed using a display form changed in accordance with the result.

As has been described above, the present invention can change the display form of accessory information of an image file determined to have been altered. The verifier can be notified in an easy-to-understand way of accessory information which may have been altered.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An image verification apparatus comprising:
    a verification unit which verifies, using verification data included in an image file, whether a digital image included in the image file has been altered; and
    a control unit which (a) controls the image verification apparatus to display additional information of the digital image on a display unit, if the verification unit verifies that the digital image has not been altered, and (b) controls the image verification apparatus not to display the additional information except a thumbnail image of the digital image on the display unit and to display both the thumbnail image of the digital image and information indicating that the digital image has been altered on the display unit, if the verification unit verifies that the digital image has been altered,
    wherein the additional information of the digital image includes the thumbnail image of the digital image.

2. The image verification apparatus according to claim 1, wherein the additional information includes information relating to the image file.

3. The image verification apparatus according to claim 1, wherein the additional information includes information relating to an apparatus which generates the image file.

4. The image verification apparatus according to claim 1, wherein the verification unit verifies whether the digital image has been altered, using a common key of common key cryptography.

5. The image verification apparatus according to claim 1, wherein the verification unit verifies whether the digital image has been altered, using a public key of public key cryptography.

6. The image verification apparatus according to claim 1, wherein the additional information does not include a file name of the image file.

7. A method of controlling an image verification apparatus, the method comprising the steps of:
    verifying, using verification data included in an image file, whether a digital image included in the image file has been altered;
    controlling the image verification apparatus to display additional information of the digital image on a display unit, if it is verified in the verifying step that the digital image has not been altered; and
    controlling the image verification apparatus not to display the additional information except a thumbnail image of the digital image on the display unit and to display both the thumbnail image of the digital image and information indicating that the digital image has been altered on the display unit, if it is verified in the verifying step that the digital image has been altered,
    wherein the additional information of the digital image includes the thumbnail image of the digital image.

8. The method according to claim 7, wherein the additional information includes information relating to an apparatus which generates the image file.

9. The method according to claim 7, wherein the additional information includes information relating to an apparatus which generates the image file.

10. The method according to claim 7, wherein a common key of common key cryptography is used in the verifying whether the digital image has been altered.

11. The method according to claim 7, wherein a public key of public key cryptography is used in the verifying step to verify whether the digital image has been altered.

12. The method according to claim 7, wherein the additional information does not include a file name of the image file.

13. A computer-readable medium that stores a program causing an image verification apparatus to perform a method of controlling the image verification apparatus, the method comprising the steps of:

verifying, using verification data included in an image file, whether a digital image included in the image file has been altered;

controlling the image verification apparatus to display additional information of the digital image on a display unit, if it is verified in the verifying step that the digital image has not been altered; and controlling the image verification apparatus not to display the additional information except a thumbnail image of the digital image on the display unit and to display both the thumbnail image of the digital image and information indicating that the digital image has been altered on the display unit, if it is verified in the verifying step that the digital image has been altered, wherein the additional information of the digital image includes the thumbnail image of the digital image.

14. The computer-readable medium according to claim 13, wherein the additional information includes information relating to the image file.

15. The computer-readable medium according to claim 13, wherein the additional information includes information relating to an apparatus which generates the image file.

16. The computer-readable medium according to claim 13, wherein a common key of common key cryptography is used in the verifying step to verify whether the digital image has been altered.

17. The computer-readable medium according to claim 13, wherein a public key of public key cryptography is used in the verifying step to verify whether the digital image has been altered.

18. The computer-readable medium according to claim 13, wherein the additional information does not include a file name of the image file.

* * * * *